Feb. 3, 1959 D. P. SMITH 2,871,969
HYDRAULIC POWER STEERING GEAR
Filed June 2, 1955 2 Sheets-Sheet 1

INVENTOR.
David P. Smith
BY
J. C. Thorpe
ATTORNEY

Feb. 3, 1959 D. P. SMITH 2,871,969
HYDRAULIC POWER STEERING GEAR
Filed June 2, 1955 2 Sheets-Sheet 2
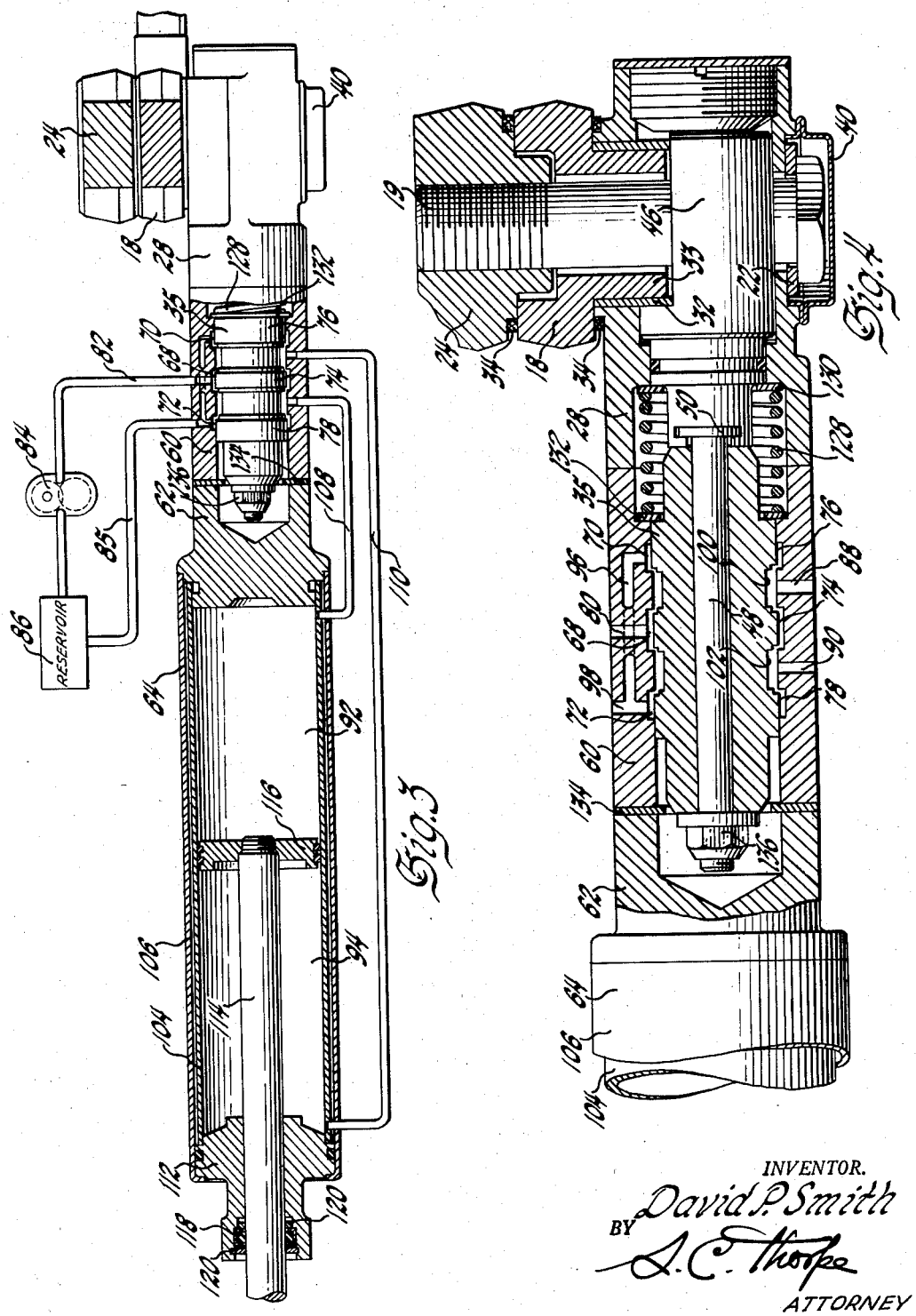
INVENTOR.
David P. Smith
BY
ATTORNEY United States Patent Office 2,871,969
Patented Feb. 3, 1959

2,871,969

HYDRAULIC POWER STEERING GEAR

David P. Smith, Essexville, Mich., assignor to General Motors Corporation, Detroit, Mich., a corporation of Delaware Application June 2, 1955, Serial No. 512,667

3 Claims. (Cl. 180—79.2)

My invention relates to the power steering of automotive vehicles and the like and more especially concerns a fluid power steering gear particularly distinguished in the means employed to actuate the valve controlling the flow of the fluid medium to the fluid motor.

Recent work in the power steering art has had as its purpose to reduce unit costs and simplify production without loss of operating efficiency, and much has been accomplished in this direction. A major advance is represented by the combined valve and power cylinder construction developed for so-called "linkage boosters," which are to be distinguished from power steering apparatus of the type wherein the control valve is directly associated with or directly actuated by the steering shaft. Gears of the latter type are often referred to as "integral" gears and their use requires substantial modification of conventional steering systems.

Previously proposed fluid power steering gears incorporating the combined valve and power cylinder are of rather limited application because of the nature of the mechanism employed to actuate the valve. Thus, in many cases it is found that smooth performance of the gear is precluded by frictional forces generated incident to the operation of the mechanism. Another fault, peculiar to those installations involving an idler arm rotatably supported on the rock or cross shaft of the steering gear and connected both to the steering linkage and to the valve and cylinder assembly, resides in the fact that such arm on the imposition of side loads tends to increase its spacing from the pitman arm which, of course, is also connected to the rock shaft; resulting in excessive bearing wear and excessive wear of certain valve parts.

My invention has as its principal object to provide an actuating mechanism for the purpose indicated, which is so constructed and arranged as to maintain a minimum amount of friction throughout the entire steering range. A further object is to provide such a mechanism in which the pitman and idler arms are disposed side by side and do not tend to separate under side loads. Still other objects and features of the invention will be apparent from the following specific description of a fluid power steering gear incorporating a preferred embodiment thereof. The description will proceed with reference to the accompanying drawings in which:

Figure 3 is a section on the line 3—3 in Figure 1, certain auxiliary apparatus being represented diagrammatically; and Figure 4 is an enlarged section showing the control valve and part of the actuating mechanism therefor.

Figures 1, 2:
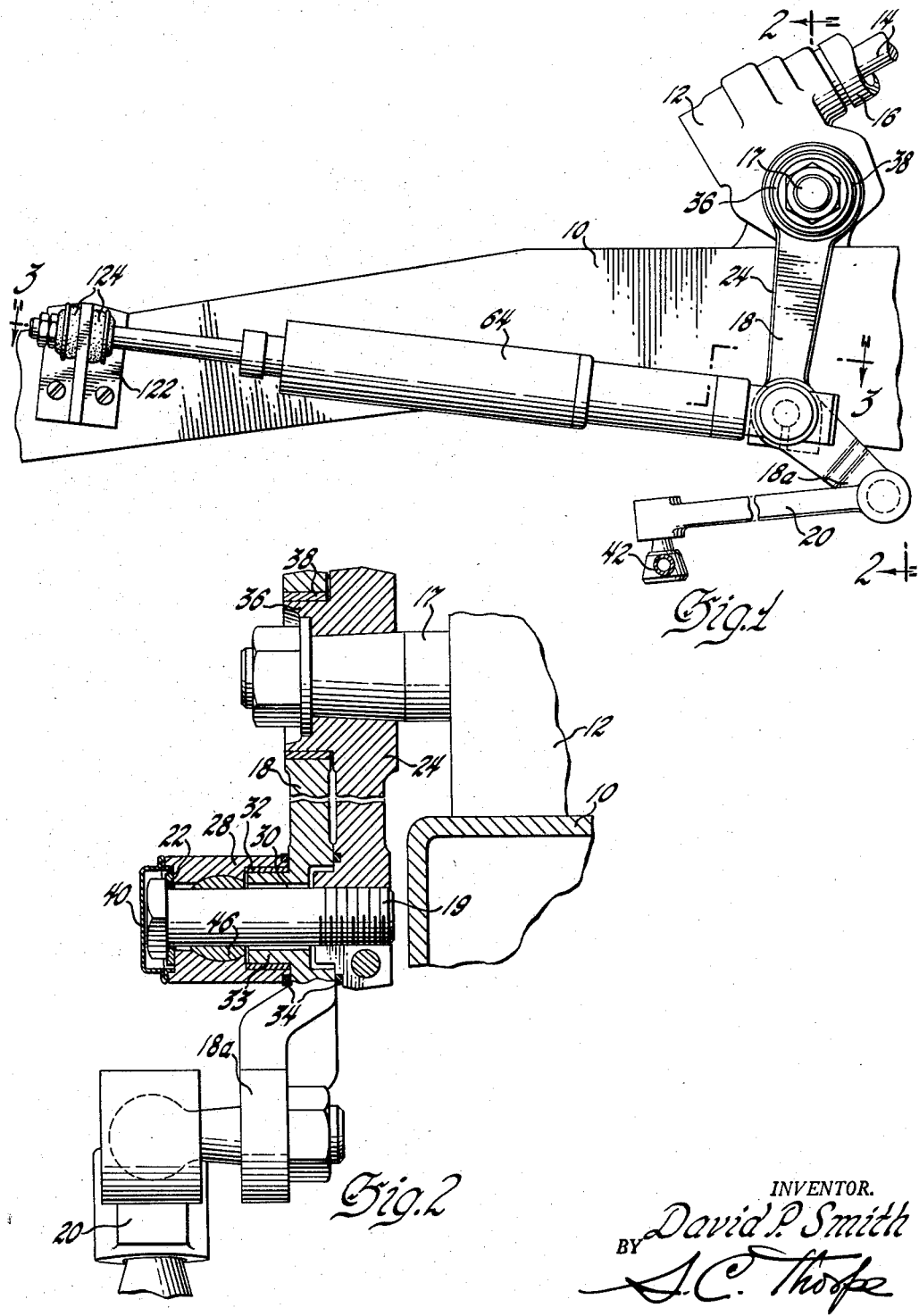
Figure 1 is a fragmentary side elevation showing the particular gear as preferably installed.
Figure 2 is a view on the line 2—2 in Figure 1.

Referring now particularly to Figure 1, the numeral 10 denotes a portion of the frame of the vehicle. Supported thereon is a gear box 12 receiving the end of a steering shaft 14, housed in a mast jacket 16 fixedly secured to the gear box. There may be encased in the gear box any suitable type of reduction gearing see, for example, the gearing disclosed in Hawkins Patent No. 2,267,524.

A rock shaft 17 (Figure 2) representing the output of the reduction gearing extends laterally of the gear box. Connected to the rock shaft so as to turn therewith is a pitman arm 24 receiving at its lower end the threaded end of a stud 19. The head of this stud is encased by a dust shield 40 and bears against a washer 22 spacing the stud head from an adapter housing member 28, through which extends an actuating shaft 46. The shank of the stud passes through an aperture in the shaft and through an opening 30 in an idler arm 18, such opening being of substantially greater diameter than the stud for reasons later to be made clear. An annular bushing 32 is interposed between the boss portion 33 of the idler arm and the adapter housing 28. This connection involves no appreciable lost motion. Seals 34 bar the entry of dust and other foreign matter.

Pitman arm 24 is forced to provide a boss portion 36 which is surrounded by the idler arm 18, an annular bushing being interposed at 38 between the two parts. The connection is such that the pitman arm is free to rotate with the rock shaft 17 relative to the idler arm, if the latter is held restrained against rotation by a force of the magnitude hereinafter indicated. The extent of this relative movement of the pitman arm is determined by the difference between the diameter of the opening 30 and that of the stud 19.

Idler arm 18 includes a downwardly and rearwardly extending portion 18a shown as connecting with a drag link 20 through a ball and socket joint. The drag link is in turn connected via a similar joint to a tie rod 42. The linkage members and other parts beyond the tie rod being conventional need not be here described.

The previously-mentioned actuating rod or shaft 46 is linked via a stem 48 to a valve spool 35, contained within a housing member 60 suitably secured to the housing member 28 and to a cap piece 62 closing the inner end of the power cylinder 64. Stem 48 will be seen as having flange 50 entrapped in a recess formed in the end of the rod 46. A nut 136 threaded on the stem at the left-hand end thereof completes the connection, which in effect makes the rod 46 and spool 35 one functional part.

The valve housing 60 is internally bored to provide annular channels 68, 70, and 72 which are functionally related to the land portions 74, 76, and 78, respectively, of the valve spool. A passageway 80 connects the annular channel 68 to the pressure line 82 (Figure 3) of a pump 84 which draws from a reservoir 86. As indicated, operation of the subject gear by an incompressible fluid such as a mineral oil of suitable viscosity is preferred, although the gear may be adapted for air or vacuum operation, for example. The pump and reservoir are shown diagrammatically as these parts are conventional in power steering apparatus. Ordinarily the pump is powered via belt and pulley from the engine of the vehicle.

In addition to passageway 80, the valve housing is fabricated to provide passageways 88, 90 through which fluid passes to the left and right hand chambers 94, 92, respectively of the power cylinder 64. Fluid returned to the reservoir 86 through line 85 leaves the valve via passageway 98 having a branch 96. Passageways 88 and 90 open, respectively, to the annular grooves 100 and 102 between the central land of the valve spool and the end lands thereof, while passageways 96 and 98 communicate with annular channels 70 and 72, respectively.

It is to be noted that the described valve is of the "open center" type, i. e., in the neutral position of the spool, the fluid medium, so long as the pump 84 is operating, continuously circulates through the valve against the static pressure of the fluid in the two chambers of the power cylinder.

The body of the power cylinder 64, as illustrated, is formed of concentric tubular members 104 and 106 (Figure 3). While the connection between the two chambers of the cylinder and the valve is shown as achieved by means of external lines 108 and 110, the construction allows for internal lines if desired. In this connection it will be readily apparent to those skilled in the art that the space between the concentric tubes 104 and 106 may be made use of as a passageway to the left-hand chamber 94 of the cylinder.

An end piece 112 closes the end of the cylinder 64 opposite the control valve and furnishes a bearing for the shaft 114 of the piston 116.

The shaft 114 extends through an oil seal 118 confined between two washers 120 for anchorage to a bracket 122 fixedly secured to the frame 10 of the vehicle. Rubber elements 124 serve an obvious purpose.

Reverting to the control valve, there will be seen at the right-hand end thereof a helical spring 128 positioned between two thrust washers 130, 132. Washer 130 bears against a shoulder within the housing member 28 and against an annular rib integral with the rod 46, while washer 132 bears against both a shoulder within the housing 60 and the land 76.

To describe the operation of the gear, let it be assumed that the steering shaft 14 is rotated clockwise to negotiate a right turn. This brings about a counter-clockwise rocking of the shaft 17 and of the pitman arm 24. Now if the resistance to steering, manifested through the drag link 20, exceeds the preloading of the spring 128, which tends to maintain the valve spool 34 centered within its housing, the initial movement of the pitman arm will necessarily displace the shaft 46, and with it the valve spool, rearwardly, thus partially or completely confining the flow of the fluid medium (depending on the exact magnitude of the steering resistance) to the left side of the valve. With the fluid flow so altered, a pressure differential is created within the power cylinder in favor of the chamber 92. Accordingly, the assembly including the cylinder and the valve is caused to move rearwardly to power the idler arm 18 and the drag link 20 in that direction, which corresponds to rightward turning of the dirigible wheels by reason of the geometry of the particular linkage system contemplated.

As the described action proceeds, the valve housing 60 is constantly seeking to catch up with the spool 35, so to speak, with the result that simultaneously with cessation of the effort at the steering wheel, it attains a position representing the neutral position of the valve spool.

In the event of a left rather than right turn, it should be obvious that the action will be just the opposite of that above described, the spool in such case being moved forwardly relative to its housing to create a pressure differential in favor of the left-hand chamber of the power cylinder.

The centering spring 128 is desirable in that it gives the operator a "steering feel." The preloading of this spring is arbitrary, representing, for example, from two to eight pounds of effort at the steering wheel. When the steering resistance is of a low value, the steering may be accomplished solely by manual effort, through the assembly, displacement of the valve spool being prevented by force of the spring. Should the power system for any reason fail, the vehicle can be readily steered manually irrespective of the resistance, the effort required being only slightly more than that demanded in the instance of conventional mechanical steering apparatus.

Considering the nature of the connection between the pitman arm 24 and the idler arm 18 and between these parts and the valve and cylinder assembly, it should be apparent that pronounced advantages are had over prior constructions wherein the two arms are disposed at opposite sides of the assembly. Thus, forces tending to separate the arms are virtually eliminated and the attaching members at the control valve shaft are rendered much simpler and less prone to fail in service. Additionally, by locating the arms in accordance with the invention at one side of the booster, a significant saving in space is achieved.

Having thus described and illustrated my invention, what I claim is:

1. Steering apparatus for an automotive vehicle or the like, which apparatus includes a steering cross-shaft the axis of which is disposed transversely of the vehicle, a pitman carried by said shaft to rotate therewith, an idler arm rotatably supported in side by side relation to said pitman and adapted for pivotal connection with a steering linkage member, said idler arm being disposed outward of said pitman and having an opening therein surrounded by a boss located on the outer face thereof, a booster assembly disposed longitudinally of the vehicle and adapted to react against a fixed portion thereof, said assembly incorporating a control valve comprising a housing portion pivotally connected to said idler arm by means of said boss and a component within said housing portion movable relative thereto, and means interconnecting said pitman and said component whereby the latter may be actuated by said pitman, said means including an element extending from said pitman through said opening with sufficient clearance to permit a predetermined degree of relative movement between said pitman and said idler arm.

2. Steering apparatus according to claim 1 where said last recited means further includes an actuating shaft operably connected to said component and where said element has the form of a bolt threaded into said pitman, the shank portion of the bolt extending through an aperture formed in said actuating shaft.

3. Steering apparatus according to claim 2 where said idler arm is rotatably supported by said pitman.

References Cited in the file of this patent
UNITED STATES PATENTS

| | | |
|---|---|---|
| 1,874,248 | Davis | Aug. 30, 1932 |
| 2,341,502 | Ingres | Feb. 8, 1944 |
| 2,356,492 | Smith | Aug. 22, 1944 |
| 2,769,502 | Ziskal | Nov. 6, 1956 |